US007685580B1

(12) United States Patent
Detlefs et al.

(10) Patent No.: US 7,685,580 B1
(45) Date of Patent: Mar. 23, 2010

(54) METHOD AND APPARATUS FOR SELECTIVELY ELIMINATING WRITE BARRIERS IN SNAPSHOT-AT-THE BEGINNING CONCURRENT-MARKING GARBAGE COLLECTORS

(75) Inventors: David L. Detlefs, Westford, MA (US); V. Krishna Nandivada, Los Angeles, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1205 days.

(21) Appl. No.: 11/215,510

(22) Filed: Aug. 30, 2005

(51) Int. Cl.
G06F 9/45 (2006.01)
G06F 12/00 (2006.01)
(52) U.S. Cl. ..................... 717/140; 707/206
(58) Field of Classification Search .............. 707/206; 717/140, 148
See application file for complete search history.

(56) References Cited

U.S. PATENT DOCUMENTS

| | | | | |
|---|---|---|---|---|
| 5,845,298 A * | 12/1998 | O'Connor et al. | ........... | 707/206 |
| 5,857,210 A * | 1/1999 | Tremblay et al. | ........... | 707/206 |
| 5,873,105 A * | 2/1999 | Tremblay et al. | ........... | 707/206 |
| 5,920,876 A * | 7/1999 | Ungar et al. | ........... | 707/206 |
| 6,049,810 A * | 4/2000 | Schwartz et al. | ........... | 707/206 |
| 6,098,089 A * | 8/2000 | O'Connor et al. | ........... | 718/104 |
| 6,115,782 A * | 9/2000 | Wolczko et al. | ........... | 711/100 |
| 6,253,215 B1 * | 6/2001 | Agesen et al. | ........... | 707/206 |
| 6,295,643 B1 * | 9/2001 | Brown et al. | ........... | 717/148 |
| 6,341,293 B1 * | 1/2002 | Hennessey | ........... | 707/206 |
| 6,658,652 B1 * | 12/2003 | Alexander et al. | ........... | 717/128 |
| 6,671,707 B1 * | 12/2003 | Hudson et al. | ........... | 707/206 |
| 6,769,004 B2 * | 7/2004 | Barrett | ........... | 707/206 |
| 7,404,182 B1 * | 7/2008 | Garthwaite et al. | ........... | 717/140 |
| 2002/0078002 A1 * | 6/2002 | Bottomley et al. | ........... | 707/1 |
| 2002/0138507 A1 * | 9/2002 | Shuf et al. | ........... | 707/206 |
| 2003/0069905 A1 * | 4/2003 | Dussud | ........... | 707/206 |
| 2004/0039759 A1 * | 2/2004 | Detlefs et al. | ........... | 707/206 |
| 2004/0186863 A1 * | 9/2004 | Garthwaite | ........... | 707/206 |
| 2006/0294165 A1 * | 12/2006 | Bacon et al. | ........... | 707/206 |

OTHER PUBLICATIONS

Rico Mariani, "Garbage Collector Basics and Performance Hints", Apr. 2003, MSDN, pp. 1-8.*
Tony Printezis and David Detlefs, "A Generational Mostly-Concurrent Garbage Collector", ISMM'00, Minneapolis MN, USA, 2000, pp. 143-154.

(Continued)

*Primary Examiner*—Wei Y Zhen
*Assistant Examiner*—Chih-Ching Chow
(74) *Attorney, Agent, or Firm*—Osha • Liang LLP

(57) ABSTRACT

In a computer system that uses a "snapshot-at-the-beginning" garbage collector and in which write barrier code is generated for pointer write instructions in order to support the operation of the garbage collector, a static analysis of the computer program source code is performed prior to generating compiled code for the application and garbage collector in order to identify source code instructions that, at runtime, will perform initializing pointer writes as indicated by the fact that they overwrite memory locations that contain a predetermined pre-write value, such as NULL. The identified instructions are then compiled in a conventional manner, but no write barrier code is generated for them. Thus, at runtime, those instructions that perform initializing writes will incur no write barrier cost penalty.

21 Claims, 6 Drawing Sheets

OTHER PUBLICATIONS

Urs Hölzle, A Fast Write Barrier for Generational Garbage Collectors. Presented at the OOPSLA '93 Garbage Collection Workshop, Washington D.C., Oct. 1993, pp. 1-6.
Yoav Ossia, et al, A Parallel, Incremental and Concurrent GC for Servers, PLDI '02, Jun. 17-19, 2002, Beriln, Germany, pp. 129-140.
Jong-Deok Choi, et al, Escape Analysis for Java, 1999, pp. 1-19.
Bruno Blanchet, Escape Analysis for Object Oriented Languages, Application to JavaTM. OOPSLA '99, pp. 1-15.
Karen Zee and Martin Rinard, Write Barrier Removal by Statice Analysis, OOPSLA '02, pp. 1-10.
David R. Chase, et al, Analysis of Pointers and Structures, PLDI '90, pp. 296-310.
John Whaley and Martin Rinard, Compositional Pointer and Escape Analysis for Java Programs, OOPSLA '99, 20 pages.
Young Gil Park and Benjamin Goldberg, Reference Escape Analysis: Optimizing Reference Counting based on the Lifetime of References, Proceedings of the Symposium on Partial Evaluation and Semantics-Based Program Manipulation, 1991, pp. 178-189.

* cited by examiner

METHOD AND APPARATUS FOR SELECTIVELY ELIMINATING WRITE BARRIERS IN SNAPSHOT-AT-THE BEGINNING CONCURRENT-MARKING GARBAGE COLLECTORS

BACKGROUND

This invention relates to garbage collectors that mark live objects concurrently with the operation of user application programs. In general, memory reclamation may be carried out by a special purpose garbage collection algorithm that locates and reclaims memory which is unused, but has not been explicitly de-allocated. There are many known garbage collection algorithms, including reference counting, mark-sweep, mark-compact and generational garbage collection algorithms. These, and other garbage collection techniques, are described in detail in a book entitled "Garbage Collection, Algorithms For Automatic Dynamic Memory Management" by Richard Jones and Raphael Lins, John Wiley & Sons, 1996.

An object may be located by a "reference", or a small amount of information that can be used to access the object data structure. Objects can themselves contain references to yet other objects. In this manner, a chain of references can be created, each reference pointing to an object which, in turn, points to another object. Some garbage collection techniques determine when a data structure is reachable by an executing program thread by starting at external roots (for example, program stack entries) and following chains of references and marking all objects encountered. After all reference chains have been followed, the memory occupied by unmarked objects can be reclaimed and reused. Object marking may be carried out by a single collector thread or may be carried out by several collector threads operating in parallel. Reclamation of unused memory is generally performed during a "sweep" phase of garbage collection that follows the marking phase.

Some marking garbage collectors stop all application threads while the marking is being performed. However, many applications cannot tolerate the significant pauses that can be introduced while marking is being performed. For example, some applications have multiple gigabytes of live data and must run continuously for months or years with maximum garbage collection pauses measured in milliseconds. A common solution to enabling garbage collection for systems in which such applications run is to employ concurrent collection, in which garbage collection and the user application execute simultaneously. Examples of such collectors are described in "A parallel, incremental and concurrent GC for servers", Y. Ossia, O. Ben-Yitzhak, I. Goft, E. K. Kolodner, V. Leikehman, and Avi Owshanko. *Proceedings of the ACM SIGPLAN* 2002 *Conference on Programming language design and implementation*, pages 129-140. ACM Press, 2002 and "A generational mostly-concurrent garbage collector", A. Printezis and D. Detlefs, *Proceedings of the International Symposium on Memory Management*, Minneapolis, Minn., Oct. 15-19, 2000.

Since the collector and the application threads are operating concurrently and the application threads may modify pointer locations that are used to perform marking by the collector, in any concurrent marking garbage collector, the application threads must inform the collector of pointer updates performed during collection. The aforementioned concurrent marking collectors use a continuous update interaction between the application threads and the collector. In particular, during their operation, application threads inform the collector of pointer locations that they modify, and the collector re-examines the locations of which it has been notified.

Other collectors use an alternative mechanism to manage application thread and collector interactions. This alternative mechanism is called "snapshot-at-the-beginning (SATB) technique, in which at the start of the marking process a logical "snapshot" is taken of a graph representing the existing objects and their relationships. The collector then follows pointers and marks objects in this graph. The application threads help to track changes to this logical snapshot by informing the collector of their actions that might disconnect parts of the original object graph and, thus, prevent the collector from reaching these parts. SATB collectors are described in the aforementioned Jones and Lins book, in particular in section 8.3.

Collectors that use SATB style marking have a major advantage over collectors that use continuous update style marking. In particular, in a SATB style marking collector, all new objects allocated after the marking process has started are considered live, so only modifications to objects already allocated at the start of the marking process need cause collection activity. In contrast, collectors that use continuous update marking must examine all modified marked objects, since any such object could hold a pointer to objects that would otherwise be "hidden" from the concurrent marking process. In general, most programs are "mostly-functional" in that a large proportion of object modifications are initializations of newly-allocated objects. Collectors that use SATB style marking can safely ignore such modifications, while collectors that use the continuous-update marking style must examine them.

In order to determine when a modification has been made to a pointer, a "write barrier" is typically used. A write barrier comprises extra code that is generated by a compiler when it is compiling any application thread code that would produce a write to a pointer location. At runtime, before a write is performed by an application thread, the write barrier code is first executed. The write barrier code can then take an appropriate action, such as informing the collector of the write operation. However, collectors that use SATB style marking have a significant drawback versus collectors that use continuous update style marking because the cost of executing the write barrier code is typically much higher for collectors that use SATB style marking.

More particularly, in collectors that use the continuous update marking style, a common approach is to use a card-marking write barrier, which can require as few as two instructions to be executed in the write barrier code that is executed for each pointer write. Such card marking write barriers are discussed in detail in "A fast write barrier for generational garbage collectors", U. Hölzle, *OOPSLA/ECOOP '93 Workshop on Garbage Collection in Object-Oriented Systems*, E. Moss, P. R. Wilson, and B. Zorn, editors, October 1993. In the generational garbage collectors discussed above, card marking write barriers are particularly efficient, since a write barrier must already be present to track the possible creation of old generation to young generation pointers. On the other hand, write barriers for use with collectors that use SATB style marking usually execute much more complicated barrier code that reads the pre-write value of the pointer field and adds this value a data structure that will later be read by a concurrent marking thread.

One method of reducing the code that must be executed by write barriers for use with collectors that use SATB style marking is to check the pre-write value of the pointer field prior to executing the remainder of the write barrier code.

Many programming languages provide a special value, here referred to as "NULL", indicating that a location of pointer type currently contains no pointer value. If the SATB write barrier determines that the write overwrites NULL, there is no pre-write pointer value to log, so the remainder of the barrier code need not be executed. In many languages (e.g., Java and C#), pointer fields of newly allocated objects are initialized to contain NULL. In many applications, the majority of pointer writes are initializing writes and, in these programs, the latter modification can significantly reduce the write barrier cost. Nonetheless, even with this modification, the pointer field must still be retrieved and its value checked. Therefore, write barrier code for use with collectors that use SATB style marking is still more costly than write barrier code for use in collectors that use continuous update style marking.

SUMMARY

In accordance with the principles of the invention, a static analysis of the source code is performed prior to generating compiled code for the application and garbage collector in order to identify source code instructions that, at runtime, will perform pointer writes and overwrite memory locations that contain the aforementioned pre-write recognized value. The identified instructions are then compiled in a conventional manner, but no write barrier code is generated for them. Thus, at runtime, those instructions that perform initializing writes will incur no write barrier cost penalty.

In one embodiment, the static analysis is performed during the generation of the compiled code.

In another embodiment, the compiler performs the static analysis.

In still another embodiment, the static analysis is performed by determining, instruction by instruction, the effect of each program code instruction on a program state. During the analysis, when a pointer store instruction that will overwrite a memory location is encountered, the program state is examined before the effect of that instruction is determined. If the program state indicates that the memory location that will be overwritten contains the predetermined value, the instruction is identified.

In another embodiment, the static analysis is performed iteratively on basic blocks of instructions and changes in the program state made by each block are propagated to successor blocks until the program reaches a steady, or fixed, state in which the initial program state provided to each basic block does not change. As each pointer store instruction is processed during this analysis, the instruction is annotated with the current judgment on whether the write barrier can be eliminated.

DETAILED DESCRIPTION

Figure 1:
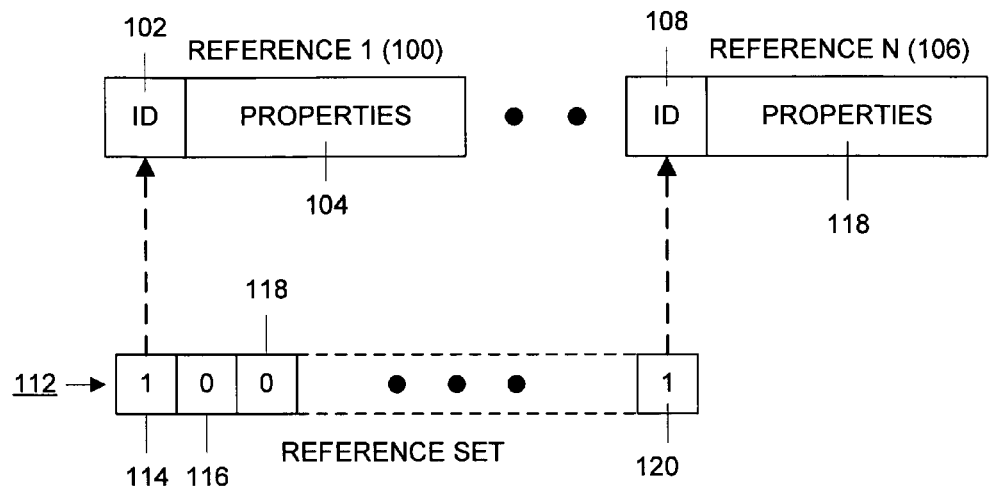
FIG. 1 is a block schematic diagram illustrating how pointers, or references, are represented in order to perform a static program analysis in accordance with the principles of the present invention.

In accordance with the principles of the invention, prior to compilation, a static program analysis is performed that identifies object reference writes that require no SATB-related write barriers in order to insure proper operation of the garbage collector. Specifically, the analysis identifies writes to heap locations known to contain a predetermined value before the write operation. In the discussion below, this predetermined value is assumed to be the NULL value; however, those skilled in the art will recognize that other values could also be used depending on the values assigned to fields of newly created objects by the computer system. A first part of the static analysis eliminates barriers for some writes to object fields, in particular, those for which the field can be shown to contain NULL before the write. In the overwhelming majority of such cases, the field is NULL because the object has been recently allocated, and the write is an initializing write. The second part of the static analysis eliminates barriers for writes to elements of object reference arrays for which the element can be shown to contain NULL before the write.

In one embodiment of the invention all analyses occur in a just-in-time (JIT) compiler such as that used in the well-known Java Virtual Machine (JVM) that has been developed and marketed by Sun Microsystems, Inc. Those skilled in the art would realize that the analyses could also be performed by another program outside of the compiler. As an example that is described below, the analysis is performed using the JVM bytecode instruction set, though, in other embodiments, the analysis could also be performed using an internal JIT compiler intermediate form. In accordance with conventional Java code processing all class files are assumed to have passed bytecode verification prior to the analysis. This verification guarantees that the code meets certain limitations as discussed below.

Each analysis is an iterative data flow analysis (also called an abstract interpretation) that computes the possible reference values that might flow into fields of objects before those fields are the subject of instructions that store their contents to memory. The input to each analysis is a method in a class file (and an existing context of already-loaded class files). The output of each analysis is a judgment, for each write to a non-static pointer field of an object, of whether an associated SATB write barrier that would ordinarily be generated for that write instruction can be eliminated.

In particular, in conventional fashion, the program state is modeled as a set of variables and mappings. Each iteration of the analysis determines how blocks of code instructions modify program states existing at the start of the blocks. Program state modifications are then propagated to successor code blocks, and iterations are continued until a steady state, or fixed point, is reached. During the analysis, when pointer write instructions are processed, each instruction is annotated with a current judgment as to whether an associated write barrier may be eliminated. The analysis is arranged to ensure that the last judgment regarding the elimination of write barriers made before a fixed point is reached will always be correct. In particular, it is assumed that, once a non-NULL value flows into an object field, the non-NULL value will not thereafter be replaced with a NULL value. Consequently, once a pointer field receives a non-NULL value, it will be necessary to associate a write barrier with any write instructions that may thereafter modify that pointer field.

Figure 2:
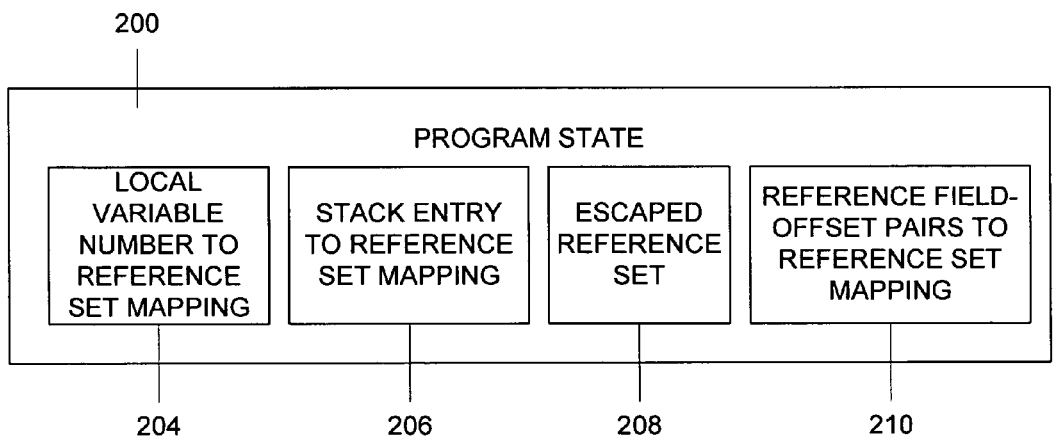
FIG. 2 is a block schematic diagram illustrating how a program state is represented by reference sets in order to perform a static program analysis in accordance with the principles of the present invention.

In order to represent the program state, C++ classes can be used to represent various program concepts. The contents of these classes are illustrated in FIGS. 1 and 2. FIG. 1 shows how pointers, or references, are represented. In particular, each reference is represented by an integer ID and a mapping of the ID to a set of properties. For example, reference 1 (100) is represented by an ID 102 and a set of properties 104. Similarly, reference N (106) is represented by ID 108 and properties 110. One or more references are created to represent objects allocated at each "allocation site." Generally, each site is an allocation instruction, such as the Java instruction "new" that creates a new object instance and returns a reference to that object instance.

References are grouped in sets. In particular, because of program branching instructions, it may be determined that, at a given point in program execution, a program variable may hold any of several reference values, representing objects allocated at distinct sites. These values are represented with a reference set, which is represented by a bit vector 112 comprising a plurality of bits, of which bits 114, 116, 118 and 120 are shown. Each set bit indicates that the associated reference is part of that set. For example, in reference set 112, bits 1 (114) and N (120) have been set indicating that references 1 and N are part of that set.

FIG. 2 illustrates how a program state is represented by reference sets. In particular, the program state 200 includes a mapping of local variable numbers to sets of reference values that the local variables could possibly contain. This mapping 204 is referred to as "ρ". In a multi-threaded environment, a reference is "thread-local" if it is accessible only by the thread that allocated the object to which the reference refers. The program state 200 further includes a mapping of stack entries to reference sets 206 referred to as "stk." An "escaped" reference set 208 is also included and referred to as non-local or "NL". A reference is considered to have "escaped" when it is known to be non-thread-local or "globally" accessible, that is, any thread can access and modify its referent. Once the reference "escapes" any thread may write to that reference and it can no longer be guaranteed that a reference field that contains a NULL value will not be changed to a non-NULL value. Thus, escaped references are not considered to have a pre-write value of NULL. Finally, a mapping 210 of reference value/object field-identifier pairs to reference sets containing possible reference values that the object field can contain ("σ") is included. Thus, the program state 200 can be represented by a "tuple" consisting of (ρ, stk, NL, σ).

Figure 3:
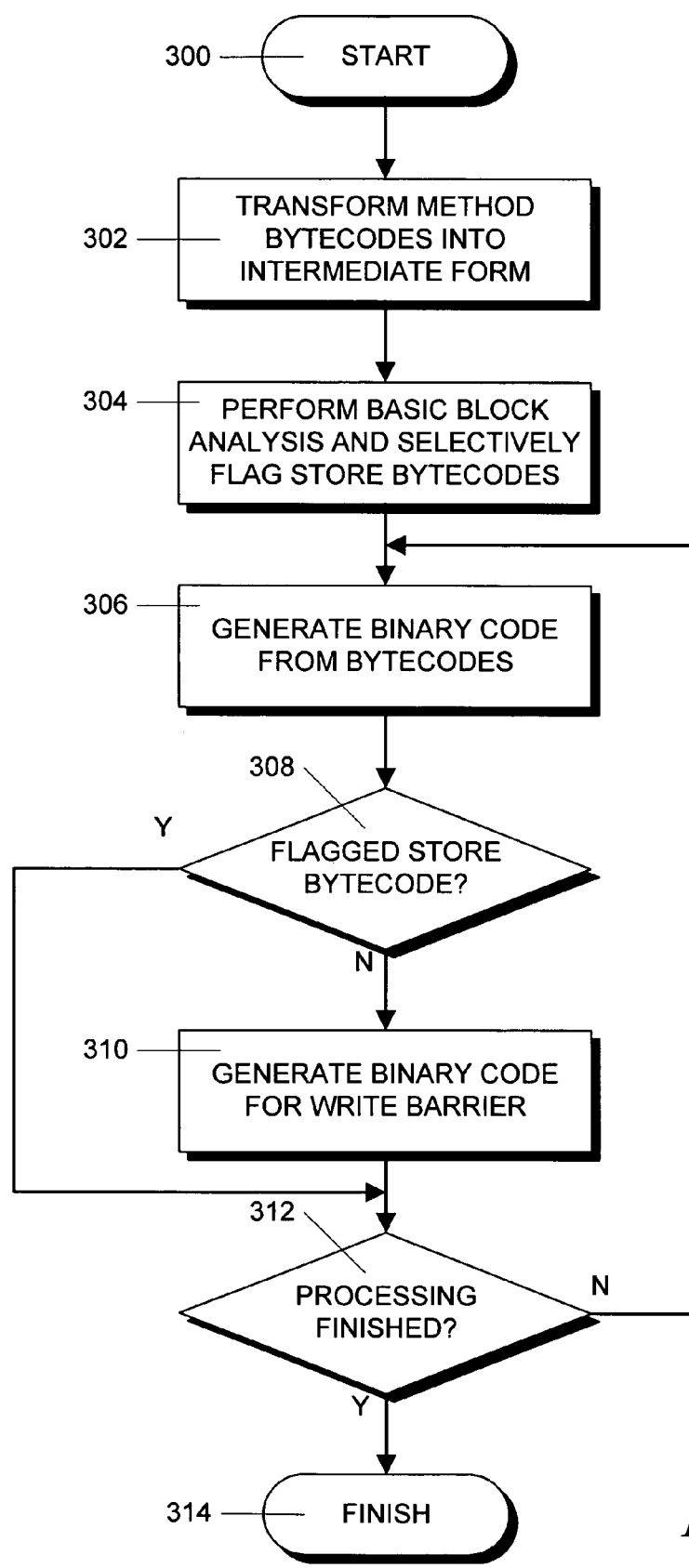
FIG. 3 is a flowchart showing the steps in an illustrative process for statically analyzing source code to determine when SATB write barrier code can selectively be omitted.
Figure 4:
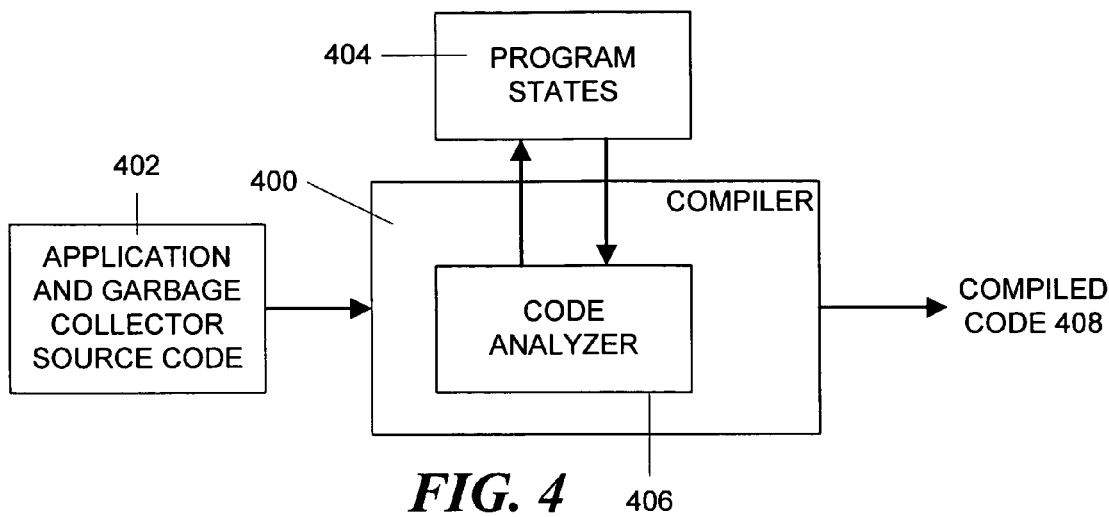
FIG. 4 is a schematic block diagram of a system which can perform the process set forth in FIG. 3.

In accordance with one embodiment, an illustrative process performed by the compiler is shown in the flowchart of FIG. 3 and illustrated in block schematic form in FIG. 4. In this embodiment, application and garbage collector source code 402 is applied to a compiler 400 that contains a code analyzer 406. However, as previously mentioned, the code analyzer 406 could also be separate from the compiler 400. The code analyzer 406 operates with program states 404 to model the operation of the program, method by method. The compilation process starts in step 300 and proceeds to step 302. The first phase of a JIT compilation of a method in the JVM JIT compiler, and in most other JIT compilers, is to translate the source bytecodes of the method into an internal form that is actually used by the compiler to perform the compilation as set forth in step 302. In a JVM JIT compiler, the internal form often has almost a one-to-one correspondence with the source bytecodes. For example; a source bytecode, such as "astore" or "aaload" is translated by creating an instance of a corresponding C++ instruction subtype.

Figure 5:
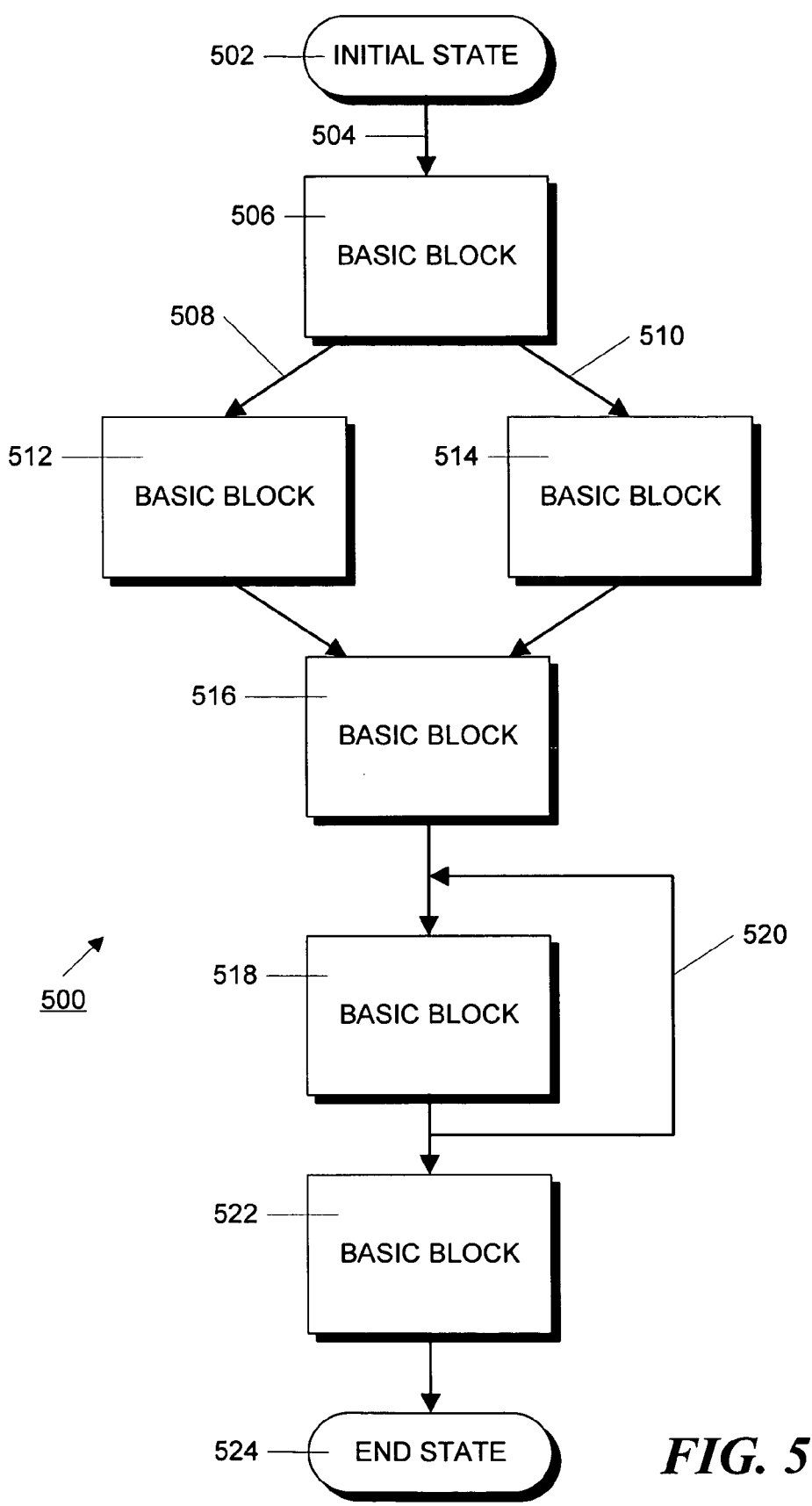
FIG. 5 is a schematic diagram illustrating how a program can be modeled as a set of basic blocks connected by control instructions.

The compiler then links the instruction subtypes together in the right order to form the method steps. This results in an intermediate form that can be represented by a set of basic blocks of code that are connected together by control instructions. Each basic block comprises a set of code instructions that has a single entry point and does not contain flow control instructions. The basic blocks are then connected together by the control instructions. This basic program flow 500 for a method is represented as shown in FIG. 5, which illustrates an example program that contains basic blocks 506, 512, 514, 516, 518 and 522. Program flow between the basic blocks is represented by arrows. For example, the program flow out of block 506 may be to block 512, as represented by arrow 508, or to block 514, as represented by arrow 510. The divergent output represents an alternative program flow, such as might occur as the result of an IF . . . THEN program instruction. The arrow 520 represents a program loop. The program shown in FIG. 5 accepts an initial program state 502 as represented by arrow 504 and creates a program end state 524 as the result of the program instructions.

With the structure shown in FIG. 5, the basic blocks can be enumerated and the start block where control flow starts can be identified. For each basic block, the intermediate form code instructions comprising it can be enumerated and its successor and predecessor blocks can be identified.

Returning to FIG. 3, the compilation process then proceeds to step 304 in which the basic blocks are analyzed by the code analyzer 406 to model the program operation. In accordance with the principles of the invention, during this process, pointer "store" instructions that would overwrite a value of NULL are flagged so that a decision can be made later whether to generate write barrier code or not. More specifically, each basic block is analyzed by enumerating its constituent intermediate form code instructions and, for each relevant instruction type, creating a program instruction method that takes, as an input, an initial program state existing before the instruction is executed and produces, as a result, a final program state that would result from the execution of the instruction.

Once a final program state has been determined for a basic block, that final state is merged into the initial state of each successor basic block. The merged state is then used as the initial state of that basic block. The analysis of the program continues iteratively until a steady state is reached. This occurs when the merging of the final program state of each basic block with the initial program state of each successor does not change the initial program state of that successor.

At this point, the process proceeds to step 306 where the compiler generates the runtime binary code from the bytecodes. During the code generation process, the compiler examines program instructions that would store pointer values. If such a store bytecode is not flagged, as determined in step 308, then the process proceeds to step 310, where the conventional SATB write barrier code is generated for that instruction.

Alternatively, if, in step 308, it is determined that the store bytecode is flagged, then the compiler skips step 310 and does not generate the SATB write barrier code for that instruction. In either case, the process proceeds to step 312, where a determination is made whether the compilation processing is finished. If not, the process returns to step 306 where further compilation is conducted. If, in step 312, it is determined that compilation is finished, the process finishes in step 314. The result is the compiled code 408 in FIG. 4.

Figure 6:
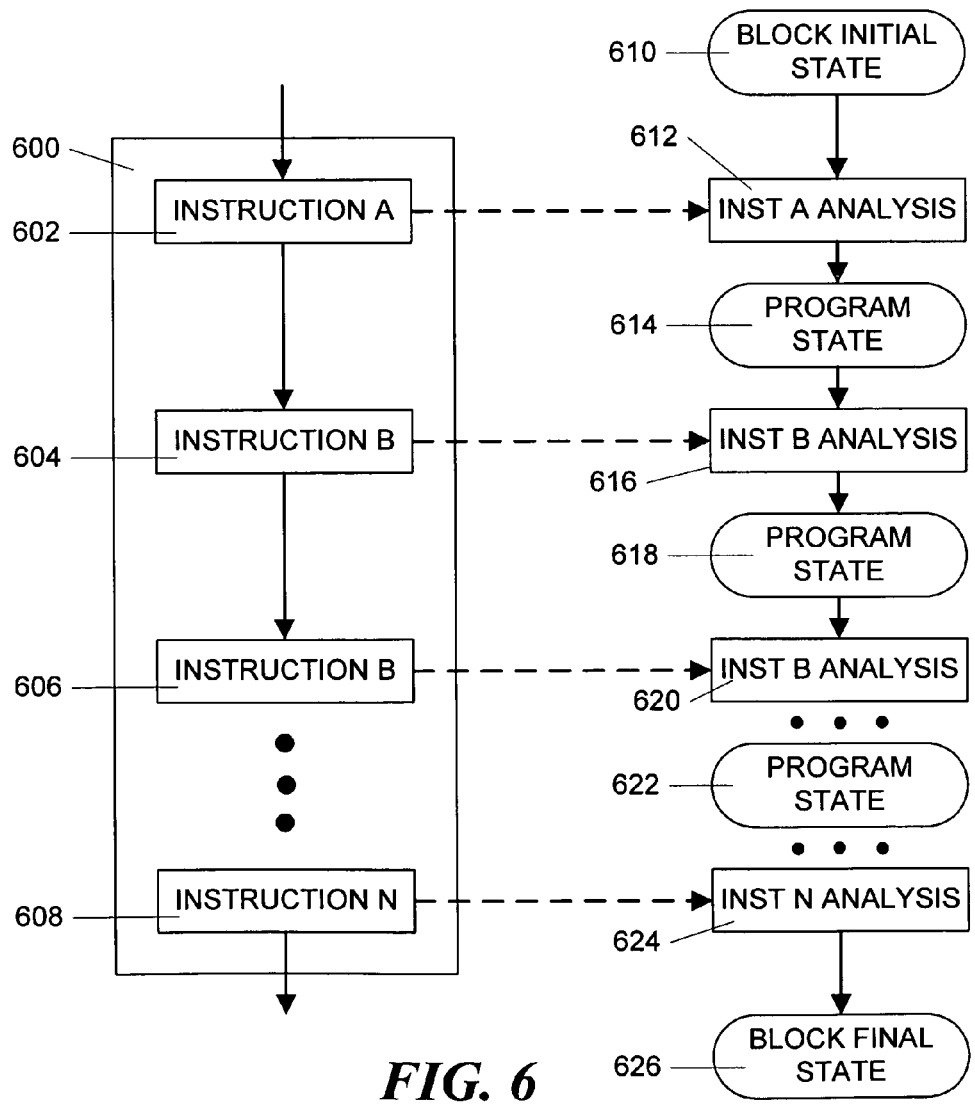
FIG. 6 is a schematic diagram illustrating how code instructions in a basic block are processed.

FIG. 6 illustrates the processing of a basic block 600 containing N instructions, of which instructions 602, 604, 606 and 608 are shown. The program flow is illustrated by the arrows between the instructions. In general, block 600 is processed by modifying the initial program state 610 provided to the block 600 by means of analysis methods that are specific to each of the instructions in the block 600 to produce a final program state 626 for the block 600. For example, the initial program state 610 is first modified by the analysis method 612, which is specific to instruction type A (as indicated by the dotted arrows), to produce an intermediate program state 614. The intermediate program state 614 is then modified by analysis method 616 which is specific to instruction type B to produce intermediate program state 618. The intermediate program state 618 is, in turn, modified by analysis method 620 which is also specific to instruction type B to produce an intermediate program state. Other instructions are processed by modifying the current intermediate program state with analysis methods that are specific to each instruction type to produce additional intermediate program states represented by program state 622. The final program state 626 is the result of program state modification by the last analysis method 624 in the block 600.

The initial program state received by, and the final program state generated by, a program instruction analysis method that represents a specific program instruction type depend on that instruction type. The initial program state and the final program state produced by the corresponding analysis method for several illustrative program instruction types are discussed below. These instruction types includes the Java bytecode instructions "load", "store", "getstatic", "putstatic", "getfield", "putfield", "invoke", "aaload" and "aastore". Those skilled in the art would understand that similar instructions or instructions in other languages could be handled in a similar manner.

The "load" and "store" instructions access and update local variables. Thus, their effect is to push and pop a variable value (x) from the stack. The effect of a "load(x)" instruction on a program state represented by ($\rho$, stk, NL, $\sigma$) is to produce a program state ($\rho$, [stk: $\rho(x)$], NL, $\sigma$) where the notation [stk: $\rho(x)$] indicates that the contents of variable x has been pushed onto the stack. Similarly the result of a "store(x)" instruction on the program state ($\rho$, [stk: val], NL, $\sigma$) is ($\rho$[x←val], stk, NL, $\sigma$) where the change in the notation [stk: val] to stk indicates that the value val was popped off the stack and notation $\rho$[x←val] indicates that a variable x has been assigned the value val.

The getstatic and putstatic instructions perform corresponding operations on static fields. However, reference values stored into static fields always "escape" since static fields can be accessed by any thread. Thus, the effect of the "getstatic(f)" to get the value of field (f) on an initial program state ($\rho$, stk, NL, $\sigma$) always returns a singleton reference set containing a value "GlobalRef" resulting in a final program state of ($\rho$, [stk: {GlobalRef}], NL, $\sigma$). The GlobalRef value is always non-local. Storing a reference value (val) into a static field (f with the "putstatic(f)" instruction causes the reference value, and any reference reachable from it by pointer paths, to be become non-thread-local (part of the NL reference set). Thus, if vals is a reference set, putstatic(f) with an initial program state of ($\rho$, [stk: vals], NL, $\sigma$) results in a final program state of ($\rho$, stk, AllNonTL(NL, vals, $\sigma$), $\sigma$) where the function AllNonTL( ) determines references reachable by pointer paths from references in the reference set "vals" and adds them to the NL set.

The "geffield" and "putfield" instructions operate on fields of heap objects. The "getfield(f)" instruction retrieves the value of a field (f) from an object referenced by the object reference obj that has been pushed onto the stack and indicated by the initial state ($\rho$, [stk: obj], NL, $\sigma$). Since, in the analysis, both the obj reference and the result of a field lookup are modeled as sets, the result is the union of the lookup result for each reference member (ot) of the reference set obj resulting in the final state of ($\rho$, [stk: $\cup\sigma$(ot,f)], NL, $\sigma$) where the symbol "$\cup$" denotes a set union.

A "putfield" instruction puts a value val on the stack into the object referenced by the object reference obj on the stack as indicated in the initial state ($\rho$, [stk: obj, val], NL, $\sigma$). Storing a reference value into a heap location via the "putfield" instruction may also cause the reference to escape, if the object into which the value is stored is itself possibly non-thread-local. The interpretation of a "putfield(f)" instruction is further complicated by the distinction between "strong" and "weak" update semantics. If the "putfield(f)" instruction updates a field (f) of a single abstract reference value (r) that is unique (denotes a single runtime value), then a "strong" update can be used resulting in the final state ($\rho$, stk, AllNonTLCond(NL, obj, val, $\sigma$), $\sigma$[(r,f)←val]) where the AllNonTLCond function updates the NL set appropriately to account for possible non-thread-local objects. Otherwise, a "weak" update must be used where the new value val is merged into the previous contents of obj (denoted as values ot) via a set union. Thus, the result of a "putfield(f)" instruction in this case is ($\rho$, stk, AllNonTLCond(NL, obj, val, $\sigma$), $\sigma$[(ot,f)←$\sigma$(ot, f)$\cup$val]). As with the previous version, the AllNonTLCond function updates the NL set appropriately.

In accordance with the principles of the invention when a putfield(f) instruction is processed, a determination is made whether the instruction requires a write barrier. More specifically, if the pre-instruction program state ($\rho$, [stk: obj], NL, $\sigma$]), in which the reference set obj is at the top of the stack, has the property that each reference in the reference set obj is still thread-local (it is not a member of the non-local set NL) and the values of the object fields to which the putfield instruction is writing are all NULL, then the SATB write barrier may be omitted. Since, as discussed below, there may be several iterations through a set of code instructions until a steady, or fixed, state is reached, judgments for individual putfield instructions may be updated several times, but a separate traversal of the code to visit putfield instructions in the final analysis state is not necessary. Even though several judgments are made for a single putfield instruction, the last judgment will be correct since, as discussed above, once a transition from a NULL value to a non-NULL value occurs, this transition is not reversed.

Somewhat similarly, passing a reference value as an argument to a method (via the "invoke" instruction) may cause the reference value to escape. Thus, if class T is a reference type, then an invoke instruction invoke(m($a_0$, . . . , $a_n$):T), which invokes method m, generates a final program state of ($\rho$, [stk: {GlobalRef}], nAllNonTL(NL, [$v_0$,...,$v_n$], $\sigma$), $\sigma$) where the nAllNonTL function updates the NL set. If T is not a reference type, then the final program state is ($\rho$, stk, nAllNonTL (NL, [$v_0$, . . . , $V_n$], $\sigma$), $\sigma$).

Reads and writes to object arrays must also be considered, since these provide another mechanism by which references may escape. Two instructions "aaload" and "aastore" are involved here. The "aaload" instruction loads values from an array and the "aastore" instruction stores values into an array. With these instructions, an object array is treated as an object with a single field $f_{elems}$ that "collapses" all elements of the array. Thus, the method representing an "aaload" instruction that receives an initial program state (ρ, [stk: arrs, ind], NL, σ), indicating that the value(s) in the array(s) referenced by the members of the reference set "arrs" at index "ind" should be loaded and pushed on the stack, generates a final program state (ρ, [stk: ∪σ(at, $f_{elems}$)], NL, σ) where the "∪" operator indicates the union of all of the reference sets σ(at, $f_{elems}$) for all of the array references "at" in the reference set "arrs." Similarly, a method representing an "aastore" instruction receiving as an initial program state (ρ, [stk: arr, ind, val], NL, σ) generates the final program state (ρ, stk, AllNonTLCond (NL, arr, val, σ), σ[(at, $f_{elems}$)←σ(at, $f_{elems}$)∪val]) where notation σ[(at, $f_{elems}$)←σ(at, $f_{elems}$)∪val] indicates a map whose contents are the same as σ, except that each pair (at, $f_{elems}$) for references at in the reference set "arrs" has been changed to the union of its old value and "val" and the function AllNonTLCond updates the non-local set NL.

Allocation instructions, such as the "newinstance" instruction, must also be considered. In modeling the effect of this instruction, it is useful to differentiate between a reference value that denotes the most recently allocated object at an allocation site (id) and a reference value that denotes all objects previously allocated at that site. The former reference value is called $R_{id/A}$ and the latter reference value is called $R_{id/B}$. With this notation, the effect of a "newinstance" instruction on the program state (ρ, [stk: obj, val], NL, σ) is to merge attributes previously associated with reference $R_{id/A}$ into attributes of reference $R_{id/B}$, and remove reference $R_{id/A}$ from the analysis state, since the execution of the instruction causes the existing most recently allocated object to become part of the set of previously-allocated objects. Then, the reference $R_{id/A}$ can uniquely denote the newly allocated object created by the instruction. In order to remove reference set $R_{id/A}$, simple substitution of reference set $R_{id/B}$ for $R_{id/A}$ suffices in the local variables (ρ) and the stack (stk). This substitution is expressed as ρ[$R_{id/A}$←$R_{id/B}$] and stk[$R_{id/A}$←$R_{id/B}$].

However, updating the heap state (σ) is somewhat more subtle and requires a transfer function, such as transfer(σ, $r_1$, $r_2$), that returns an abstract store that is like a except that r, has been removed from the domain, and any entries for fields of $r_1$ have been merged into the corresponding fields of $r_2$. Thus, for the aforementioned heap state σ this transfer function would take the form:

transfer($r_1$, $r_2$, σ)=(σ−$r_1$) [for each f: ($r_2$, f)←σ($r_2$,f)∪σ($r_1$, f)]

If $R_{id/A}$ had become non-thread local, then $R_{id/B}$ is added to the non-locality set (NL). Since $R_{id/A}$ will now denote a reference to a newly-allocated thread-local object, $R_{id/A}$ is removed from the non-locality set. Finally, $R_{id/A}$ is pushed on the operation stack as the result of the allocation instruction.

The same type of analysis can be carried out for arrays of objects. for example, the Java language specification states that a newly allocated array of an object type has all array elements set to null. Therefore, just as with object field writes, the first (initializing) writes to such array elements do not require SATB barriers. In order to extend the analysis to object arrays, the program state tuple is extended to track integer, as well as reference, values. This is accomplished by redefining the ranges of the ρ and σ mappings and the stack (stk) to include integer values (IntVal.).

An IntVal is a linear combination of integer terms. These terms may be integer constants or the product of an integer coefficient and an integer unknown. An unknown may be constant (have the same value in all states; denoted $c_i$), or variable (represent the same value in any one state, but have different values in different states; denoted $v_i$). In order to simplify the analysis, IntVals are allowed to have at most one term in a variable unknown, one constant term, and zero or more terms in constant unknowns. Consequently, they take the form: au+$k_0c_0$+ . . . +$k_nc_n$+b. Symbolic arithmetic can be on IntVals, but certain operations (for example, addition of IntVals involving different variable unknowns) produce a value that is equal to the full range of values (denoted as the "top value" $T_{iv}$) as their result. In addition, operations where one of the elements is $T_{iv}$ yield the result $T_{iv}$. Another example of an operation that returns $T_{iv}$ is an invocation of a method with an integer return type.

In addition, two new mappings are added to the program state, "length" and "null range (NR)" The length mapping maps references to arrays to the array lengths and contains IntVals. The NR map maps object array references to a subrange of valid array indices known to be NULL and contains integer ranges (IntRanges). An IntRange is represents a subsequence of the sequence of valid indices of an array. There are several kinds of IntRanges. A full IntRange is a (closed) integer interval, bounded by two IntVals, such as [$iv_1$_$iv_2$]. This IntRange kind is used only to represent an array's uninitialized indices immediately after the allocation of the array. There are also two types of "half-open" ranges. If the uninitialized range for an array is [iv..], this denotes the set of valid indices i of the array such that i≧iv. Alternatively, if the range is [..iv], this denotes the set of valid indices i of the array such that i≦iv. The empty range is denoted by [ ]

With these changes to the program state tuple, the effects of two array instructions are as follows. The "newarray" instruction operates on the program state (ρ, [stk: n], NL, σ, length, NR) to create a new array of length n and is very similar to "newinstance" instruction discussed above. It updates the first four program state components (ρ, stk, NL and σ) in the same way as the "newinstance" instruction discussed above. The "newarray" instruction also records the length of the newly allocated array as denoted by length[$R_{id/A}$←n], and notes that the entire range of valid indices currently maps to NULL as denoted by NR[$R_{id/A}$←[0, n−1]].

The "aastore" instruction writes to an element of an object array. It is similar to the "aastore" instruction discussed above and updates the first four program state components (ρ, stk, NL and σ) in the same way as that latter instruction. In addition it updates the NR map to indicate that the "aastore" instruction may have written into the null range of the array, causing it to "contract." This contraction is represented by a "contract" function that recognizes stores at either end of the uninitialized range. Such a function might consist of:

contract([au+b..x], au+b)=[au+(b+1)..]
contract([x..au+b], au+b)=[..au+(b−1)]
otherwise: contract([x..y], i]=[ ]

where, in the above equations, [x..y] is intended to match the half-open range [z..].

Figure 7A:
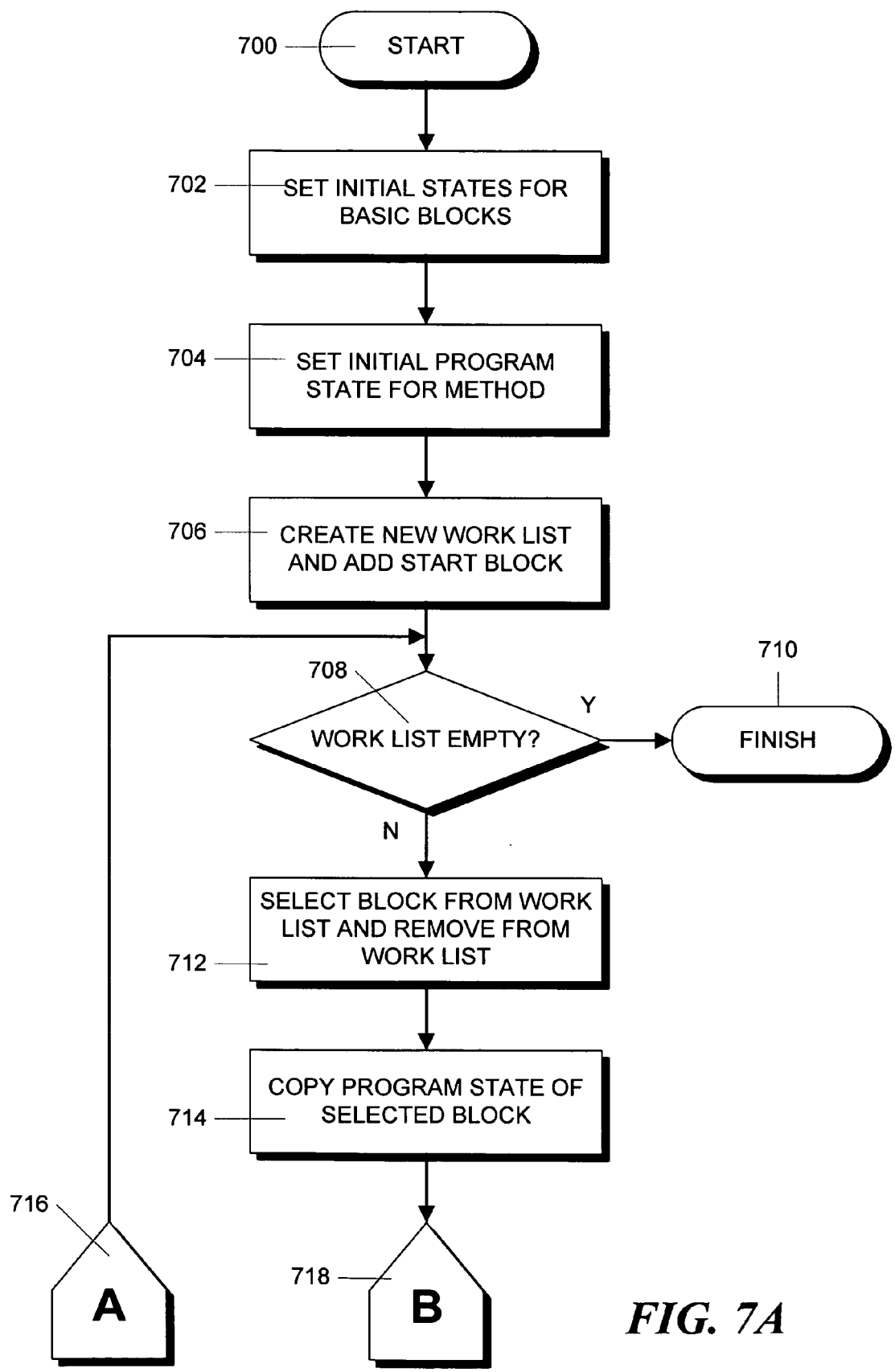
FIGS. 7A and 7B, when placed together, form a flowchart showing the steps in an illustrative process for processing the program model of FIG. 5.
Figure 7B:
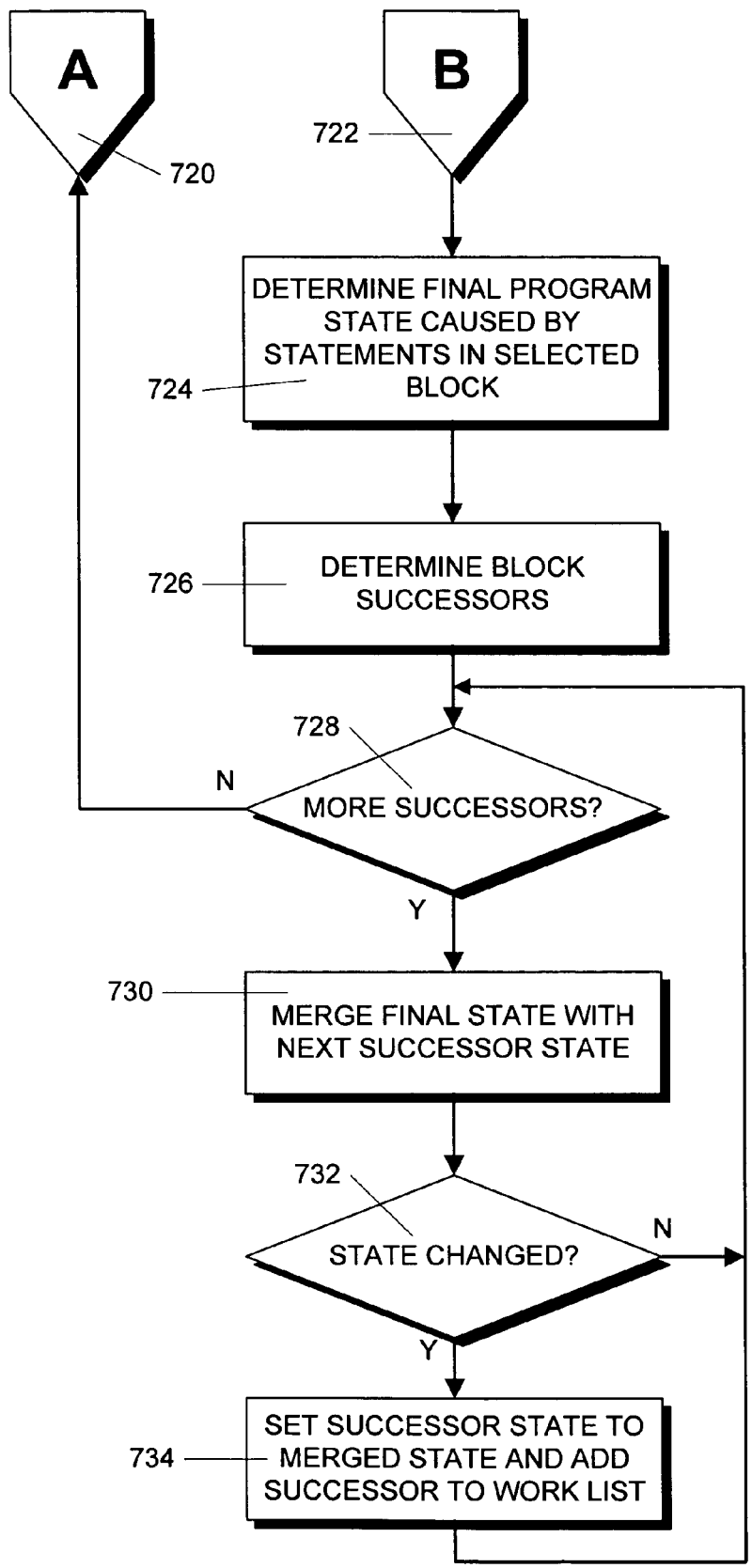

With the aforementioned methods for generating the final program state for a basic block given an initial state, the analysis proceeds block by block to compute the program state. An illustrative process for analyzing the program is shown in FIGS. 7A and 7B that, when placed together, form a flowchart describing the process. This process begins in step 700 and proceeds to step 702 where the program states associated with the start of each basic block are initialized. For example, each element in the local variable set ρ is set to a value indicating that the variable has no value or has not yet been visited. This value is called the "bottom" value; it is distinct from NULL and is an analysis value that corresponds to no specific runtime value. Similarly, each field in the object field set σ is also set to the bottom value. The initial stk values at each program point are stacks of the appropriate operand stack height for the program point, whose element values are all the bottom value. The NL set is initialized to the singleton set GlobalRef. Further, all field references in the field set a that are reachable via GlobalRef are collapsed into Global-Ref.

The initial program state at the method entry must also be defined. The initial NL set contains at least the GlobalRef reference. For each input parameter i of object or array type, an "argument" abstract reference value Ra(i) is created, and initialized as $\rho[i]$==Ra(i). With one exception discussed below, an assumption is made that these input reference values have escaped, and therefore Ra(i) is added to the initial NL set. For each input parameter i of integer type, a constant unknown $c_i$, is created and initialized $\rho[i]$==$c_i$. For input parameters i of array type, in addition to creating the abstract reference value Ra(i), a further constant unknown $c_i$ is created to represent the length of the array denoted by Ra(i), and this constant is recorded in the length map: length[Ra(i)]==$c_i$. The operand stack is initially empty; the initial σ is as described above (with a possible addition as described below.)

Non-constructor methods receive the initial state described above. Constructors differ only in their treatment of the "this" parameter, which is initialized with the abstract argument reference Ra(0). As previously mentioned, during bytecode verification, the bytecode verifier enforces a constraint that fields of a newly-allocated object may not be accessed before a constructor for that object has been executed (if such a constructor exists). Consequently, on entry to a constructor for class T, an assumption is made that Ra(0) is not a member of the non-thread-local set NL, and that the fields defined in class type T are null for the object being constructed. Thus, for each field (f) in the object being constructed σ(Ra(0); f)=NULL.

Next, in step 704, the initial method entry state (502 in FIG. 5) is set (indicated schematically by arrow 504) to be the initial program state of the method start block 506, which, as described above, can be ascertained from the basic block structure of the program. Next, in step 706, an empty work list is created to handle the processing of the basic blocks. The work list is necessary in order to iteratively process the blocks taking into account that an initial program state applied to a basic block may change after that block has been initially processed, thereby requiring that block to be revisited. The start block is then added to the work list.

In step 708 a determination is made whether the work list is empty. If so, the process finishes in step 710. However, if at step 708 it is determined that the work list is not empty, then, in step 712, the next basic block on the list is selected and then deleted from the work list.

Next, in step 714, the initial (pre-execution) program state of the selected basic block is copied and saved. The process then proceeds, via off-page connectors 718 and 722, to step 724 where the final program state as produced from the initial program state by the program instructions in the selected block is determined in accordance with the process set forth in FIG. 6 and discussed above.

Then, in step 726, the block successors are determined by examining the basic block structure shown in FIG. 5 and discussed above. Then, for each successor, the final program state of the basic block under consideration is merged with the initial state of that successor. More specifically, in step 728 a determination is made whether additional successors must be processed. If so, the process proceeds to step 730 where the final state of the basic block under consideration is merged with the initial state of the next successor.

When the final program state of a basic block is merged into the initial state of each of successor, that successor is marked as changed, if necessary. In general when two program states are merged, the element-wise merge of the program state tuples is computed. Since the set of local variables in the method under analysis is fixed, and the aforementioned bytecode verification ensures that operand stack heights agree at join points, the local state mapping variables ρ and stk may be merged element-wise. The non-local reference sets (NL) are merged by set union. The set of reference values and field identifiers is fixed and finite, so the range of the σ map can be merged at all points in the domain.

The merge operation for an object array is somewhat more complicated because the array elements are typically initialized in a program loop. For example, the following code illustrates a method called "expand" that doubles the size of an exiting array ta by allocating a new array (new_ta) and assigning the old array element values to the new array elements:

```
T[ ] expand(T[ ] ta) {
T[ ] new_ta=new T[ta.length*2];
for (int i=0; i<ta.length; i++)
new_ta[i]=ta[i];
return new_ta;
}
```

The following is a typical analysis of the assignment loop. In particular, the allocation of the new array (new_ta) in the program line:
T[ ] new_ta=new T[ta.length*2];

updates the program state to ((ρ, stk, NL, σ, length[$R_a$(k)]=$c_k$, NR($R_{id/A}$)=[0..2*$c_k$−1]) where ta is argument k of expand, and $R_{id/A}$ represent the result of the allocation. Next the "for" loop is entered in the program code lines:
for (int i=0; i<v.length; ++i)
nv[i]=v[i];

In the preamble of the loop, the constant 0 is stored in local variable i, and this assignment is recorded in the ρ local variable mapping. The assignment to nv[i] is effected by an "aastore" bytecode instruction. As discussed above, execution of this instruction causes the uninitialized range of nv to contract to [1..].

Then, control flow in the loop returns the process to the loop head. At this point the current program state must be merged into the program state recorded when the loop head was first visited. The loop head initial program state (denoted as $S_0$) was ( . . . , ρp[i]=0, . . . , NR($R_{id/A}$))=[0, 2*$c_k$−1]). After the first loop iteration, the current program state ($S_1$) is ( . . . , ρ[i]=1, . . . , NR($R_{id/A}$))=[1..]). In order to merge the two program states $S_0$ and $S_1$ the integer-valued elements of the ρ and stk mappings and the IntVals that are the bounds of the uninitialized ranges are merged component by component. With this merging process it can be shown that the lower bound of the uninitialized range of the new array new_ta is equal to value of the loop variable i in the program sample loop above. Thus, after n iterations of the loop, the program state ($S_n$) is ( . . . , ρ[i]=n, . . . , NR($R_{id/A}$))=[n..]).

Returning to FIG. 7, after the final state of a basic block has been merged into a successor block's initial state in step 730, the process proceeds to step 732 where a determination is made whether the merge changed the successor block's initial program state. If the program state remains unchanged, then the successor need not be processed due to a program state change. In this case the process returns to step 728 to determine whether any additional successors remain to merge the final program state with the successor initial state.

Alternatively, if in step 732, it is determined that the merging of the final program state with a successor initial state changes the program state, then that successor must be processed or reprocessed. Thus, in step 734, the successor initial state is set to the merged state and the successor basic block is added to the work list for subsequent processing (if the successor block is not already on the work list.) Then the process returns to step 728 to determine if additional successors basic blocks are present.

When the program final state has been merged with the initial states for all successor blocks as determined in step 728, the process returns, via off-page connectors 720 and 716, to step 708 where a determination is made whether the work list is empty. If the work list is not empty the next basic block on the list is processed as discussed above. An empty work list is indicative that the program analysis has reached a steady or final state with all relevant pointer stores examined and flagged as necessary.

A software implementation of the above-described embodiment may comprise a series of computer instructions fixed on a tangible medium, such as a computer readable media, for example, a diskette, a CD-ROM, a ROM memory, or a fixed disk. The series of computer instructions embodies all or part of the functionality previously described herein with respect to the invention. Those skilled in the art will appreciate that such computer instructions can be written in a number of programming languages for use with many computer architectures or operating systems. Further, such instructions may be stored using any memory technology, present or future, including, but not limited to, semiconductor, magnetic, optical or other memory devices. It is contemplated that such a computer program product may be distributed as a removable media with accompanying printed or electronic documentation, e.g., shrink wrapped software, preloaded with a computer system, e.g., on system ROM or fixed disk, or distributed from a server or electronic bulletin board over a network, e.g., the Internet or World Wide Web.

Although an exemplary embodiment of the invention has been disclosed, it will be apparent to those skilled in the art that various changes and modifications can be made which will achieve some of the advantages of the invention without departing from the spirit and scope of the invention. For example, it will be obvious to those reasonably skilled in the art that, in other implementations, the inventive method and apparatus can be used with languages other than Java. The order of the process steps may also be changed without affecting the operation of the invention. Other aspects, such as the specific process flow, as well as other modifications to the inventive concept are intended to be covered by the appended claims.

What is claimed is:

1. A method for selectively eliminating write barrier code in a system that executes a garbage collection and an application, comprising:
   obtaining bytecode corresponding to the application and comprising a plurality of instructions;
   identifying, within the plurality of instructions, a first write operation to a first memory location storing a predetermined value, wherein the first write operation is identified by:
      determining an initial program state existing before execution of the first write operation;
      calling a program instruction analysis method for the first write operation taking the initial program state as an input, wherein the program instruction analysis method is based on an instruction type of the first write operation; and
      analyzing, using the program instruction analysis method the first write operation to generate a final program state resulting from execution of the first write operation;
   flagging, in response to the first memory location storing the predetermined value, the first write operation;
   identifying, within the plurality of instructions, a second write operation to a second memory location storing a value other than the predetermined value; and
   generating runtime binary code from the plurality of instructions by:
      preventing, in response to flagging the first write operation, generation of write barrier code for the first write operation;
      generating write barrier code for the second write operation,
   wherein the garbage collection and the application communicate based on a snapshot-at-the-beginning (SATB) technique.

2. The method of claim 1, wherein generating runtime binary code is performed by a just-in-time compiler.

3. The method of claim 2, further comprising:
   translating the bytecode into an intermediate code readable by the just-in-time compiler.

4. The method of claim 3, wherein generating the binary runtime code comprises evaluating the intermediate code.

5. The method of claim 1, wherein flagging the first write operation is executed by a code analyzer.

6. The method of claim 1, wherein flagging the first write operation is executed by a compiler.

7. The method of claim 1, wherein the instruction type updates and produces results for the final program state.

8. A system for selectively eliminating write barrier code comprising:
   a processor executing a garbage collection and an application; and
   a memory operatively connected to the processor and storing instructions comprising functionality to:
      obtain bytecode corresponding to the application and comprising a plurality of instructions;
      identify, within the plurality of instructions, a first write operation to a first memory location storing a predetermined value, wherein the first write operation is identified by:
         determining an initial program state existing before execution of the first write operation;
         calling a program instruction analysis method for the first write operation taking the initial program state as an input wherein the program instruction analysis method is based on an instruction type of the first write operation; and
         analyzing, using the program instruction analysis method, the first write operation to generate a final program state resulting from execution of the first write operation;
      flag, in response to the first memory location storing the predetermined value, the first write operation;
      identify, within the plurality of instructions, a second write operation to a second memory location storing a value other than the predetermined value; and
      generate runtime binary code from the plurality of instructions by:
         preventing, in response to flagging the first write operation, generation of write barrier code for the first write operation;
         generating write barrier code for the second write operation,
      wherein the garbage collection and the application communicate based on a snapshot-at-the-beginning (SATB) technique.

9. The system of claim 8, wherein generating runtime code is performed by a just-in-time compiler.

10. The system of claim 9, the instructions further comprising functionality to:
   translate the bytecode into an intermediate code readable by the just-in-time compiler.

11. The system of claim 10, wherein the instructions for generating the runtime binary code comprise functionality to evaluate the intermediate code.

12. The system of claim 8, wherein flagging the first write operation is executed by a code analyzer.

13. The system of claim 8, wherein flagging the first write operation is executed by a compiler.

14. The system of claim 8, wherein the instruction type updates and produces results for the final program state.

15. A computer readable medium storing instructions for selectively eliminating write barrier code in a system that executes garbage collection and a user application, the instructions comprising functionality to:
   obtain bytecode corresponding to the application and comprising a plurality of instructions;
   identify, within the plurality of instructions, a first write operation to a first memory location storing a predetermined value, wherein the first write operation is identified by:
      determining an initial program state existing before execution of the first write operation;
      calling a program instruction analysis method for the first write operation taking the initial program state as an input wherein the program instruction analysis method is based on an instruction type of the first write operation; and
      analyzing, using the program instruction analysis method, the first write operation to generate a final program state resulting from execution of the first write operation;
   flag, in response to the first memory location storing the predetermined value, the first write operation;
   identify, within the plurality of instructions, a second write operation to a second memory location storing a value other than the predetermined value; and
   generate runtime binary code from the plurality of instructions by:
      preventing, in response to flagging the first write operation, generation of write barrier code for the first write operation;
      generate write barrier code for the second write operation,
   wherein the garbage collection and the application communicate based on a snapshot-at-the-beginning (SATB) technique.

16. The computer readable medium of claim 15, wherein generating runtime code is performed by a just-in-time compiler.

17. The computer readable medium of claim 16, the instructions further comprising functionality to:
   translate the bytecode into an intermediate code readable by the just-in-time compiler.

18. The computer readable medium of claim 17, wherein the instructions for generating the runtime binary code comprise functionality to evaluate the intermediate code.

19. The computer readable medium of claim 15, wherein flagging the first write operation is executed by a code analyzer.

20. The computer readable medium of claim 15, wherein flagging the first write operation is executed by a compiler.

21. The computer readable medium of claim 15, wherein the instruction type updates and produces results for the final program state.

* * * * *